United States Patent Office 3,293,140
Patented Dec. 20, 1966

3,293,140
PROCESS FOR OBTAINING PRODUCTS RICH IN BIFIDUS II FACTOR
Michel C. G. A. Henry, Neuilly-sur-Seine, France, assignor to Eurorga, Seine-et-Oise, France, a company of France
No Drawing. Filed Dec. 5, 1963, Ser. No. 328,185
Claims priority, application France, Dec. 8, 1962, 918,010; Aug. 12, 1963, 944,462, 944,463; Mar. 20, 1964, Patent 1,355,563
6 Claims. (Cl. 195—4)

This invention relates to the production of bifidus II factor.

It is known that the bifidus II factor, which is probably a peptide, can be freed from the casein, ox liver, insulin and pepsin, by the controlled action of various proteolytic enzymes, for example trypsin, pepsin, papain or subtilysin.

The substances hitherto known having the highest content of bifidus II factor are certain products of the enzymatic hydrolysis of casein, but in some products the factor is found associated with an antagonist, called anti-bifidus II.

It has now been found that certain initial low cost materials not only represent a very valuable potential source of bifidus II factor, but also have the advantage that the factor is found therein without its antagonist. Starting with these materials, it is possible to obtain products rich in bifidus II factor.

The process of the invention for the production of products rich in bifidus II factor comprises subjecting fish intestines, either alone or accompanied by other fish viscera, to autolysis.

The fish which supply the starting material may be any fish which are caught in large-scale sea fishing, for example, tunny, salmon, shark, sardine, cod and mackerel. The use of mackerel intestines, especially those of *Scomber scombrus*, is especially preferred. In certain cases, the intestines may be associated with the liver (or with the hepato-pancreas in the case of fish in which the two ograns are united). The presence of milt and other visceral residues is not objectionable.

When the proportion of intestines in the total fish viscera subjected to autolysis does not exceed 5%, it is expedient to carry out the autolysis in the presence of a proteolytic enzyme, preferably an enzyme of vegetable origin, such as papain or ficin, as the degradation caused by such enzymes is less strong and more easy to control than that caused by an enzyme of animal origin. As a general rule, the proportion of such an enzyme to be added is of the order of 0.05 to 0.2%, by weight of the total fish viscera treated.

The proteases and catheptases of the intestines ensure a very rapid proteolysis at a temperature of 50° to 55° C. in a medium the pH of which is between 5.8 and 6.2, and the proteolysis is frequently completed in 2 to 3 hours. In practice, the proteolytic digestion time can be extended to 3, 4 or even 8 to 10 hours.

Any appropriate acid can be added to adjust the pH to the value indicated above. In practice, if the final product is intended for nutritional purposes, an acid permissible from this point of view is employed, for example hydrochloric acid, sulphuric acid, a phosphoric acid or acetic acid. This latter is particularly preferred because of its inherent volatility and that of its salts with ammonia and the amines.

Before the autolysis (whether or not assisted by added enzymes) it is of advantage to carry out an anti-bacterial treatment to avoid bacteriolysis. It is convenient for this purpose and to bring the mass quickly to the autolysis temperature to inject into it steam at a temperature of at least 100° C., for example about 105° C. The water added by this step has the additional effect of facilitating the homogenisation of the mass and of better distributing the added acid. The autolysis mass is preferably kept in an agitated state during this injection and during the autolysis.

The autolysis may be carried out either in an open container or a closed container. When the autolysis has proceeded to the desired extent, the enzymes are inactivated. This is conveniently done by raising the temperature of the mixture to 70° C. to 85° C., a temperature of about 80° C. being preferred. This temperature may be maintained for several hours, for example 2 to 15 hours.

After this treatment, any solid materials which may have remained in suspension are separated and the oily phase is then separated from the aqueous phase, which contains the bifidus II factor. These separations can be carried out by filtration and centrifuging. Between two of these operations or subsequently, the aqueous phase can be brought to boiling point for a relatively short period of time, for example 10 to 30 minutes, to coagulate the proteins and to facilitate filtration.

In order to drive off at least the major part of the acid, more especially acetic acid, and the salts formed with the amonia and volatile amines and at the same time to concentrate the aqueous phase, it is advantageous to concentrate the aqueous phase in vacuo in one or several stages. In particular, it is possible to concentrate the aqueous phase at a temperature from about 35° C. up to 40 or 45° C. under an absolute pressure of 4 to 6 cm. of mercury (an equilibrium being set up between pressure and temperature) so as to eliminate the volatile constituents of the aqueous phase including the water.

There is thus obtained a pasty concentrated product containing one or more thousand bifidus II units per gram (as estimated by the Raynaud method) and which, unlike known proteolysis products, contains no anti-bifidus factor.

It is not possible by the same treatment to obtain a product having as high a bifidus II factor from whole fish, and the content is higher in proportion as the proportion of intestines is larger.

According to a modification of the new process, the autolysis is carried out in a mixture of animal, e.g. ox, liver and the aforesaid fish viscera. It is possible to start from fresh or frozen liver, and the proportion of liver to viscera may vary, but is preferably from 3:1 to 1:1.

The liver may first be subjected to a proteolysis with an enzyme, preferably of vegetable origin, e.g. papain or ficin; and the proportion of enzyme relative to liver is preferably 0.05 to 0.2%. The autolysis of the fish viscera is then carried out after mixing the latter with the peptonised liver, as described above. The concentrate of bifidus II factor is isolated in the same manner.

The following examples illustrate the invention.

EXAMPLE 1

There are used 20 kg. of intestines and 10 kg. of hepato-pancreas from *Scomber scombrus*. These are mixed in an autolyser in the open air and they are brought to 55° C. in a maximum time of 15 minutes, acidified to bring the pH value to 5.9 and then slowly churned for 8 hours while the temperature is kept at 55° C. and the pH value maintained at 5.9 by adding acetic acid (using, in all, 150 ml. of glacial acetic acid).

The mixture is then heated to 85° C. and maintained at this temperature for 10 hours. It is centrifuged to separate the oily phase, and the aqueous phase is boiled for 20 minutes, filtered and concentrated in vacuo (at a pressure of 4 to 6 cm. Hg and a temperature of 35 to 40° C.). In this way, there are obtained 4.2 kg. of a paste containing 60% of solids.

EXAMPLE 2

500 kg. of frozen ox liver are thawed overnight at +4° C. The thawed liver is minced with a conventional meat mincer (having a grid of 2 mm.) In an open autolyser with a capacity of 1000 litres, 300 litres of water are heated to a temperature of 60° C. The 500 kg. of minced liver are then suspended in the heated water while the heating is continued. When the temperature of the mass reaches 58 to 60° C., 1 kg. of papain is added. The temperature is kept at 58 to 60° C. while the mass is slowly stirred for 1½ hours. The temperature is then lowered to 55° C. and 250 kg. of intestines (including pyloric diverticula) of fresh *Scomber scombrus* are added thereto. The mass is slowly churned for 4 hours while the temperature is kept at 55° C., and the pH at 5.9 with acetic acid.

The autolysed mass is brought to 85° C. after 4 hours and this temperature is maintained for about 10 hours without churning, so that the fatty materials can be separated by decantation. The lower aqueous phase is drawn off, roughly filtered (or passed to a clarifier), freed from oil, first by centrifuging and then by passage through a filter press. The completely oil-free autolysis liquid is then concentrated in vacuo (at a pressure of 4 to 6 cm. of mercury and at a temperature from 35 to 40° C.)

In this way, there are obtained 150 kg. of a paste containing 64% of solids in the form of autolysate of ox liver and intestines, including pyloric diverticula) of *Scomber scombrus*. The concentration can be stopped at a solids content of 25–30% if the concentrate is to be atomized; or the paste of 64% solids content can be re-diluted for atomization.

The products obtained by the process of the invention have been used in nutrition experiments in mice. They were added to a synthetic diet, which, although complete, did not allow abundant growth of lactobacilli in the intestine. It was thus established that the products of the invention increased (two to a hundred fold) the intestinal population of lactobacilli.

When administered to chickens, the product of the invention makes possible the implanation of *Lactobacillus bifidus* (vertified by coprocultures). The quantity of the products included in the chicken's food to secure this effect is about 1% by weight of the food (calculated on solids content).

The products of the invention can be used to prevent intestinal disorders and, in dietetic therapy, to maintain or regenerate the lactic flora, especially the bifidus flora.

The invention accordingly includes within its scope pharmaceutical compositions, for oral administration, comprising the bifidus II factor obtained by the process of the process of the invention in association with a pharmaceutical carrier.

Such compositions may be, for example, gelatine capsules containing 0.2 to 0.5 g. of the dry product or ampoules containing the product diluted with water.

An example of the latter type of composition is an ampoule containing 5 ml. of a drinkable aqueous dispersion of the product. This dispersion is clear and of a known colour and it preferably has the following characteristics:

pH, 5–6.

Nitrogen content, total (for 100 cc.) $\geq$ 0.9 g. ($\equiv$ 0.045 g. per 5 ml.).

Nitrogen content, amines (for 100 cc.) $\geq$ 0.22 g. ($\equiv$ 0.012 g. per 5 ml.).

Ratio, amine nitrogen/total nitrogen >25% (e.g. 26.6%).

Bifidus II factor content (for 100 cc.) >400 bifidus units.

The contents of such ampoules can be ingested alone or they can be used as a vehicle for the ingestion of *Lactobacillus acidophilus* and *Escherichia coli*, especially $10^9$ of the former and $1.5 \times 10^7$ of the latter (using lyophilized material from antibiotic-resistant strains).

It is especially advantageous to use the products of the invention in association with the therapeutic composition described in my copending application Serial No. 295,516, filed July 16, 1963.

The compositions of the invention may also be in the form of tablets, which may or may not be coated, containing, for example, 0.2 to 0.5 g. of dry product per tablet.

I claim:

1. A process of the production of bifidus II factor, which comprises subjecting fish viscera including fish intestines to bactericidal treatment in steam at a temperature of at least 100° C., protelytically digesting said fish viscera in the presence of an enzyme selected from the group consisting of papain and ficin at a temperature of about 50–55° C. and a pH of about 5.8 to 6.2, subsequently treating the treated mixture to inactivate the enzymes present, separating the aqueous phase from said treated mixture, and recovering bifidus II factor from the separated aqueous phase.

2. A process according to claim 1, in which the fish viscera are derived from *Scomber scombrus*.

3. A process for the production of bifidus II factor, which comprises treating an animal liver with an enzyme selected from the group consisting of papain and ficin, mixing the treated animal liver with fish intestines, proteolytically digesting the mixture at about 50–55° C. and a pH of about 5.8 to 6.2 to obtain bifidus II factor in an aqueous phase, subsequently heating the treated mixture to about 70–85° C. to inactivate the enzymes present, separating the aqueous phase from said treated mixture, and recovering bifidus II factor from said aqueous phase.

4. A process according to claim 3, wherein the recovery step includes evaporating said aqueous phase under reduced pressure.

5. A process according to claim 3, wherein the animal liver is ox liver.

6. A process for the production of bifidus II factor, which comprises proteolytically digesting fish intestines at about 50° to 55° C. and a pH of about 5.8 to 6.2 to obtain bifidus II factor in an aqueous phase, separating said aqueous phase from the remainder of the reaction mixture, and recovering bifidus II factor from said aqueous phase.

References Cited by the Examiner

UNITED STATES PATENTS

| | | | |
|---|---|---|---|
| 2,576,066 | 11/1951 | Caldwell | 195—29 |
| 3,003,880 | 10/1961 | Erickson | 99—7 |

OTHER REFERENCES

Levesque, C.A. 55, 20090 i–20091c (1961).

A. LOUIS MONACELL, *Primary Examiner.*

L. M. SHAPIRO, *Assistant Examiner.*